United States Patent [19]
Cadeddu

[11] 4,046,977
[45] Sept. 6, 1977

[54] FLUID RESERVOIR

[75] Inventor: Leonardo Cadeddu, Crema, Italy

[73] Assignee: Benditalia S.p.A., Italy

[21] Appl. No.: 600,710

[22] Filed: July 31, 1975

[30] Foreign Application Priority Data

Aug. 22, 1974 Italy .................................. 26501/74

[51] Int. Cl.² ........................................... H01H 35/40
[52] U.S. Cl. .................................................. 200/84 C
[58] Field of Search ................ 200/84 C, 84 B, 84 R; 340/244 A, 52 C, 59; 73/308

[56] References Cited

U.S. PATENT DOCUMENTS

| | | | |
|---|---|---|---|
| 3,342,960 | 9/1967 | Dillon et al. | 200/84 C |
| 3,560,918 | 2/1971 | Lewis et al. | 200/84 C |
| 3,849,770 | 11/1974 | Hayashida | 200/84 C |

*Primary Examiner*—David Smith, Jr.
*Attorney, Agent, or Firm*—Ken C. Decker; William N. Antonis; Paul David Schoenle

[57] ABSTRACT

A fluid reservoir is made of non magnetic material and comprises two chambers communicating with a common well. A float is disposed in the well and bears a permanent magnet, and a switch is disposed outside the reservoir. The switch is actuated by the magnetic field of the magnet when the float is at a predetermined level in the reservoir.

2 Claims, 1 Drawing Figure

U.S. Patent  Sept. 6, 1977  4,046,977
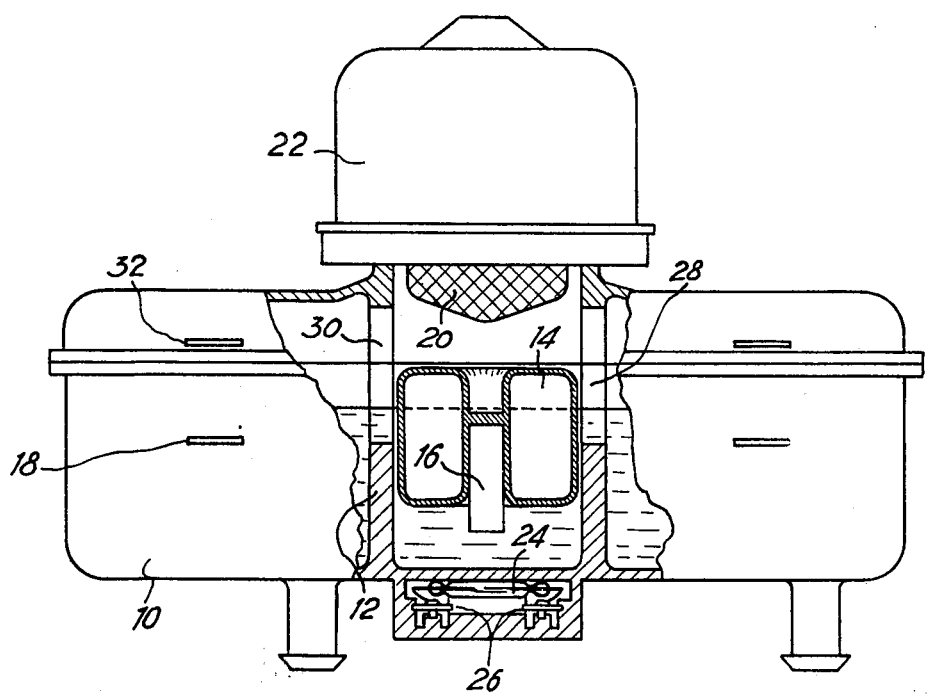

FLUID RESERVOIR

The invention relates to fluid reservoir having means for indicating the level of fluid therein, for use more particularly with a master-cylinder of a vehicle braking system, so as to actuate an alarm device when the level approaches the minimum value.

In some known reservoirs, a float is attached to a rod and actuates an electrical switch. In such devices, there are usually electric contacts which may come into contact with the brake fluid and may therefore be oxidised. Furthermore, in the aforementioned devices, the electrical parts have to be hermetically sealed from the reservoir exterior, so that brake fluid can be introduced under small pressure during the bleed phase of the vehicle braking system.

The invention provides a fluid reservoir having a level indicator wherein no electric conductor enters or leaves the reservoir, no hermetic sealing is required, and a filter and plug with a moisture separator can be disposed on the filler plug.

The invention proposes a fluid reservoir made of non-magnetic material and defining two chambers communicating with a common well wherein is disposed a float and an electric switch which is actuated by the float when the latter is at a predetermined level in the reservoir, the float bearing a permanent magnet and the switch being disposed outside the reservoir and actuated by the magnetic field of the magnet.

The invention is now described in reference with the drawing in which the sole FIGURE illustrated a longitudinal view with partial cut-away of a double reservoir for a brake master-cylinder.

The reservoir 10 is made of non-magnetic material e.g. aluminium or plastics. The tank is formed with a suitable guide seat 12 which defines therein a two separate chambers on each side of a common well in which a float 14 can move vertically and rotate. Each chamber is adapted to communicate through refilling sleeves integral with the bottom of the reservoir, with refill orifices provided in the master-cylinder housing. Narrow vertical slots 28, 30 are provided in the guide seat 12 to ensure communication between the chambers and the well. The lower ends of the slots are located high enough in the reservoir so that a safety predetermined quantity of fluid is retained in one chamber in case of fluid depletion of the other chamber and the upper ends of the slots are located high enough so that a maximum amount of fluid is admissible into the chambers from the well.

A permanent magnet 16 is secured at the bottom of float 14 and projects therefrom and rests on the bottom of the reservoir when the level of liquid is less than or equal to the value MIN 18. When the liquid level is below or equal to the value MIN 18, float 14 rises to increasingly high levels until it stops at filter 20 or, if there is no filter, at plug 22 located above the well. The plug 22 covers the single refill aperture located above the float 14.

A "reed" magnetic switch 24 is disposed outside reservoir 10, at the bottom thereof and opposite the place where magnet 16 bears. The contacts of switch 24 are normally open and comprise two resilient strips of ferro-magnetic material. Both contacts are separately connected to electrical connecting means 26, consisting of coupled connectors, adapted to be included in the circuit of an alarm device.

If the level of fluid in the container is equal to MAX 32, float 14 and magnet 16 are at the top end of their travel and the contacts of switch 24 are open.

When the fluid level decreases, float 14 begins to descend. When the fluid level is near the value MIN 18, the magnetic field of magnet 16 produces magnetic induction in the contact strips of switch 24, so that they are attracted to one another and the contact closes. The attraction increases in proportion as the magnet approaches the switch, which ensures very reliable operation. When the level further decreases, magnet 16 descends until it bears against the bottom of the reservoir, and switch 24 remains closed. If the fluid level decreases further, the two portions separate owing to the slots 28, 30.

What I claim is:

1. A fluid reservoir made of non-magnetic material comprising two chambers communicating with a common well, a single reservoir refill aperture located between the two chambers and above said well and communicating with said well, a float disposed in said well and bearing a permanent magnet and a switch outside said reservoir under the bottom of the well, said switch being actuated by the magnet when the float is at a predetermined level in the well, said well communicating with the two chambers through vertical narrow slots, the location of the lower ends of said slots being such that a predetermined quantity of fluid is retained in one chamber in case of fluid depletion of the other chamber, the upper ends of said slots being above the maximum fluid level admissible in the reservoir to permit fluid refilling of the chambers from said well via the single reservoir refill aperture up to said maximum fluid level.

2. The fluid reservoir of claim 1 in which a plug is located above the well and said plug being removable to expose said well.

* * * * *